(12) United States Patent
Margolis (10) Patent No.: US 9,164,266 B2
(45) Date of Patent: Oct. 20, 2015

(54) COMPLEX MODULAR AFOCAL VARIATOR WITH SPHERICAL AND CHROMATIC ABERRATION CORRECTION

(75) Inventor: H. Jay Margolis, Boulder, CO (US)

(73) Assignee: Infinity Photo-Optical Company, Boulder, CO (US)

(*) Notice: Subject to any disclaimer, the term of this patent is extended or adjusted under 35 U.S.C. 154(b) by 1067 days.

(21) Appl. No.: 13/202,522

(22) PCT Filed: Feb. 17, 2010

(86) PCT No.: PCT/US2010/024446
§ 371 (c)(1),
(2), (4) Date: Aug. 19, 2011

(87) PCT Pub. No.: WO2010/096461
PCT Pub. Date: Aug. 26, 2010

(65) Prior Publication Data
US 2011/0304927 A1   Dec. 15, 2011

Related U.S. Application Data

(60) Provisional application No. 61/153,896, filed on Feb. 19, 2009.

(51) Int. Cl.
*G02B 15/15*      (2006.01)
*G02B 15/173*     (2006.01)
*G02B 15/02*      (2006.01)

(52) U.S. Cl.
CPC .............. *G02B 15/15* (2013.01); *G02B 15/173* (2013.01); *G02B 15/02* (2013.01)

(58) Field of Classification Search
CPC ...... B02B 15/10; B02B 15/173; B02B 15/04; B02B 15/06; B02B 15/177; B02B 15/02; B02B 15/12; B02B 15/14

USPC ................................................. 359/672–675
See application file for complete search history.

(56) References Cited

U.S. PATENT DOCUMENTS

| | | | |
|---|---|---|---|
| 2,937,570 A | | 5/1960 | Hillman |
| 3,023,673 A * | | 3/1962 | Cox et al. ...................... 359/687 |
| 3,030,863 A * | | 4/1962 | Schwartz et al. ............. 359/687 |
| 4,015,895 A * | | 4/1977 | Hirose .......................... 359/673 |
| 4,318,585 A | | 3/1982 | Matsumura |
| 4,641,928 A | | 2/1987 | Hamanishi |
| 4,988,173 A | | 1/1991 | Margolis |
| 5,054,896 A | | 10/1991 | Margolis |
| 5,452,133 A | | 9/1995 | Margolis |
| 6,661,583 B2 * | | 12/2003 | Shinohara ..................... 359/673 |
| 6,760,154 B1 | | 7/2004 | Focht |
| 7,869,139 B2 | | 1/2011 | Margolis |
| 2007/0273980 A1 | | 11/2007 | Horiuchi |

FOREIGN PATENT DOCUMENTS

FR          2572545          5/1986

OTHER PUBLICATIONS

International Search Report from International Application No. PCT/US2010/024446, mailed Apr. 16, 2010, 7 pages.

* cited by examiner

*Primary Examiner* — Scott J Sugarman
(74) *Attorney, Agent, or Firm* — Lathrop & Gage LLP (57) ABSTRACT

The present invention provides a complex modular afocal variator in which a modular afocal variator is supplemented with additional optics to form a more complex, but still modular afocal variator system, that can impart internal focusing as well as active spherical and chromatic aberration corrective improvement.

15 Claims, 7 Drawing Sheets

PRIOR ART

COMPLEX MODULAR AFOCAL VARIATOR WITH SPHERICAL AND CHROMATIC ABERRATION CORRECTION

CROSS REFERENCE TO RELATED APPLICATIONS

This application is the U.S. National Stage of International Application No. PCT/US2010/024446, filed Feb. 17, 2010 and published in English on Aug. 26, 2010 as WO 2010/096461, which claims the benefit of U.S. Provisional Application 61/153,896, filed Feb. 19, 2009; all of which are hereby incorporated by reference in their entirety to the extent not inconsistent with the disclosure herein.

BACKGROUND OF THE INVENTION

The present invention relates to an optical system in which a non-formula-specific modular afocal variator in combination with a supplemental lens system provides the optical system with both focusing means and active spherical and chromatic aberration corrective improvement for distant and near-focus. The combination of the modular afocal variator with the supplemental lens system produces a new type of integrated focusing device for optical systems that is itself a modular system.

Optical variators are typically used in optical systems to change the magnification of an image. For example, afocal variators have been used in projector lenses to alter the size of a projected image on a screen. In many instances, optical variator devices are used in combination with a front optical system or a rear optical system. In some instances they have even been used in combination with both a front objective system and a rear optical system. However, traditional optical systems which incorporate variator optical systems to alter the size of an image are not able to focus the image, and are usually only functional at relatively short back focal distances.

While the use of variators, either alone or in combination with either a front optical system or a rear optical system, are known, they largely are not known to have been used to alter active focal length so as to act as a focusing system as opposed to a system for altering image size at a fixed focal plane, such as a zoom lens. In the past where it has been desired to alter focal length, this has usually been accomplished by continuously or discretely changing the length of the optical system, or by changing the location or type of imaging lenses in the front, rear, or both front and rear optical systems. Generally the prior art has altered focal length by manipulating the imaging lens system, changing the length of the optical system, or changing the location or type of lenses in either the front or rear optical systems.

For example, Hillman (U.S. Pat. No. 2,937,570) discloses a telescope system in which the image forming lenses are moved in order to focus the system. Focusing is accomplished by moving the objective lens relative to the focusing lens, both of which are part of the telescope's "formula-specific" objective imaging system. Focusing is not accomplished or taught to be feasible by moving a central, modular position of an afocal variator, nor by determining the optical effect of an afocal variator and incorporating its front and rear elements into the image-forming optics, but still retaining a central modular element which is non-image-forming and essentially non-formula specific.

Matsumura (U.S. Pat. No. 4,318,585) discloses an optical system with an afocal focusing group, but in which the afocal focusing group is a Galilean telescope rather than an afocal variator. Furthermore, the system as taught by Matsumura does not incorporate the front, rear or front and rear elements of an afocal variator into the calculation and formulation of the image forming optics.

Quenderff (French Patent No. 2,572,545) teaches the use of a zoom lens to make enlarged pictures, and also teaches the use of various known mechanical devices for connecting together optical modules. However, it does not disclose the use of a central afocal variator module as a focusing element.

Margolis (U.S. Pat. No. 4,988,173), in contrast, teaches the use of a modular afocal variator optical system which can be used in optical instruments, such as long-distance microscopes, as the mechanism for providing focus. However, in this reference the modular afocal variator does not impart active spherical or chromatic aberration corrective improvement within the characteristics of the modular afocal variator itself. This modular afocal variator may in fact cause additional spherical and chromatic aberration.

While U.S. Pat. No. 4,988,173 teaches the use of a modular afocal variator as the focusing means of optical devices, it does not teach that under specific conditions the modular afocal variator can be supplemented with a lens system which can be positioned to impart active transitional spherical and chromatic aberration corrective improvement when incorporated in optical devices so as to provide focus and improved image quality over a range of far and near focal points. Additionally, the modular afocal variator of U.S. Pat. No. 4,988,173 has additional limitations, such as the functional size of the aperture of the optical system. What is needed is an improved modular afocal variator system that provides active correction of spherical and chromatic aberration and greater operational parameters.

SUMMARY OF THE INVENTION

In view of the foregoing, the present invention provides an optical system in which a modular afocal variator (MAV) is supplemented with additional optics to form a more complex, but still modular afocal variator system. Provided that the supplemental optics are added to a MAV, such as a MAV taught in Margolis (U.S. Pat. No. 4,988,173), the resulting complex modular afocal variator system (CMAV) no longer acts simply as a focusing means, but also acts in conjunction with the specific supplemental optics as a transitionally active spherical and chromatic corrective improvement system. Thus, the CMAV of the present invention serves at least three primary functions simultaneously: 1) changing the magnification of an image, 2) variable internal focusing, and 3) active spherical and chromatic corrective improvement. The use of a CMAV, which not only serves as a focusing means but also acts as a transitionally active spherical and chromatic improvement system which can be incorporated within any optical device into which it can be physically interfaced, is believed to be novel, unique and previously not taught in the art.

The complex modular afocal variator (CMAV) of the present invention comprises: a) a fixed length housing; b) a first positive lens system, a central negative lens system, and a second positive lens system in optical series disposed within the fixed length housing, where the central negative lens system is positioned between the first and second positive lens systems and is able to be moved continuously towards and away from the first positive lens system and towards and away from the second positive lens system; and c) a supplemental lens system disposed within the fixed length housing, wherein the supplemental lens system comprises a supplementary positive lens system and a supplementary negative lens system that are of equal power or near equal power to each other, and wherein the supplemental lens system is positioned in front of the first positive lens system or positioned behind the second positive lens system. In a further embodiment, the CMAV comprises a second supplemental lens system disposed within the fixed length housing, wherein one of either the supplemental lens system or second supplemental lens system is positioned in front of the first positive lens system and the other is positioned behind the second positive lens system. Preferably, the supplemental lens system or second supplemental lens system should be positioned as near to the MAV as practicality will permit regardless of whether the supplemental lens system is in front of or behind the MAV.

The supplemental lens systems and second supplemental lens systems comprise a positive lens system in contact with or positioned in close proximity with a negative lens system of equal power or near equal power. Preferably the optical power of the supplementary positive lens system and negative lens system are within 10% of each other, within 5% of each other, within 1% of each other, or more preferably the same as each other. Because the supplementary positive and negative lens systems are of equal or close to equal power, the addition of the supplemental lens system will minimally affect the focusing function of the device compared to a similar MAV which does not have the supplemental lens system. In one embodiment, the supplemental lens systems used herein have neutral optical power or near neutral optical power. In one embodiment, the negative and positive lenses are achromatic lenses. Preferably, the supplementary negative and positive systems are chosen to have the same or similar focal lengths to that of the second positive lens system of the MAV.

In a further embodiment, the supplementary positive and negative lens systems can be moved slightly closer together or further apart, if desired. This can be accomplished by moving the supplementary positive lens system, the negative lens system, or both. In one embodiment, the distance between the MAV and at least one of the supplementary positive lens system or negative lens systems remains constant. The distance between the supplementary positive lens system and supplementary negative lens system can range from zero (they contact each to other) to any distance within reasonable limits so as not to depart markedly from the afocal condition of the supplemental lens system. It can be expected that a reasonable separation between the supplementary positive lens system and supplementary negative lens system can be made to accommodate a more efficient acceptance of an incoming or exiting beam of light or other electromagnetic source.

The fixed length housing is any tube or structure used in optics able to house lenses and other optical devices. Preferably, the fixed length housing is an elongated approximately cylinder-shaped tube, but can be any shape suitable for optical devices as known in the art. The fixed length housing may also comprise means for adjusting or manipulating optical components disposed within the housing. For example, the fixed length housing may comprise known means in the art for moving the central negative lens system between the first and second positive lens systems.

Optionally, the fixed length housing includes a front end connecting means for substantially permanently connecting with a front optical system and a rear end connecting means for substantially permanently connecting with a rear optical system. In this way, the CMAV may be inserted into various optical systems and devices. The CMAV of the present invention may be put into substantially any optical system into which it can physically fit with substantial disregard for formula specificity. If the CMAV were to be removed from the modular optical systems of the present invention, it would not substantially change the characteristics of the optical system in which it had formerly been placed. For example, where the CMAV is positioned in a telescope between a front objective lens system and a rear optical lens system it can be used to focus the telescope. However, if the CMAV of the present invention were to be removed from the telescope the remaining system would still function as a normal telescope.

In one embodiment, the present invention teaches the construction of optical systems and devices which can incorporate a MAV with supplemental optics which then becomes, in effect, an entirely new type of modular focusing system which not only focuses optical systems, but also actively improves their correction for spherical and chromatic aberrations from distant to near focus to function reasonably over a wide range of possible working distances.

In a further embodiment, the present invention provides active spherical and chromatic corrective improvement by means of a MAV supplemented with additional optics that then becomes a total modular focusing/aberrationally-improving system to telescopes, microscopes or other lens systems of all types and focal lengths as are suited for use with it, so that numerous variants of the active spherical and chromatic aberration improving system may be provided.

In another embodiment, the present invention teaches an active spherical and chromatic aberration correctively-improving modular system which is predicated upon a set of rules for such incorporation into optical systems of various types. Additionally, the modular variation system incorporates removable and system-separable rear supplements so that the original non-active system is essentially restored in function.

The complex modular afocal variation systems of the present invention can be additionally supplemented with compressor or expander lens systems. For example, positive or negative lens systems positioned in back of said modular afocal variator that may or may not be subsumed into the rear lens system of the modular afocal variator itself, depending on need or design criteria. The systems and devices of the present invention may also be designed for easy integration into robotically-controlled or motor-controlled optical devices, whether controlled manually or by computer control or by equivalent devices. Optionally, the systems and devices of the present invention further allow out-gassing of devices in which the modular system is used in vacuum environments such as laser focusing chambers or in outer space.

In a further embodiment, the present invention provides CMAV modules providing active spherical and chromatic corrective improvement which are produced with rear supplemental optical systems able to be oriented in multiple ways so that multiple modules have varying desired spherical and chromatic characteristics, one of which will be more or less best-suited to almost any optical device in which it is incorporated. Multiple CMAV modules may be structurally similar allowing the modules to be physically interchangeable and easily inserted and replaced in standard optical systems and devices. It is believed having multiple structurally similar CMAV modules able to be incorporated "off the shelf" into optical systems and devices will ease optimization and construction and make such optical systems and devices more economical to manufacture. Optionally, optical systems contain multiple devices having CMAV modules of the present invention which can be used either ganged or elsewhere, such as in a multi-port optical device.

In one embodiment, the present invention provides optical systems that are able to image, with suitable accessories if necessary, directly onto sensors which have fields typical of those in common microscopical, telescopical or photographical practice, such as fields generally equal to or even greater than, those of typical microscope or telescope eyepieces, or of typical photographical formats or video formats. In one embodiment, the image is projected onto sensors having fields typical of those used in common microscopical practice. In another embodiment, the image is projected onto virtually any screen or sensor of large size, such as, but not limited to, those used in cinema projection, video projection or micro projection.

The foregoing embodiments of the present invention are obtained by providing optical systems with an incorporated spherical and chromatic aberration correctively-improving modular system composed of the combination of a MAV with supplemental optical systems (forming a CMAV) which have the ability to vary the actual focal length of the system without the need to physically change the length dimension of the body of the optical system or other optical systems, or without the need to change the lens system of the lens position of the front of the optical system or the rear optical system, if any.

These and other embodiments of the present invention will become apparent to those skilled in the art from the following detailed description, showing the contemplated novel construction, combination, and elements as herein described, and more particularly defined by the appended claims, it being understood that changes in the precise embodiments of the herein disclosed invention are meant to be included as coming within the scope of the claims, except insofar as they may be precluded by the prior art.

DETAILED DESCRIPTION OF THE INVENTION

As henceforth used throughout this application, "modular afocal variator system (MAV)" shall mean an optical system which includes in optical series a positive lens system, called the "front positive lens system" or "first positive lens system"; a moveable central negative lens system, called the "central negative lens system"; and another positive lens system, called the "rear positive lens system" or "second positive lens system", as described and set forth in U.S. Pat. No. 4,988,173, including all permutations disclosed in said patent dealing with focusing means. As used herein, a "lens system" can comprise a single lens or more than one lens as is known in the art.

As used herein, "neutral optical power" means the particular lens system is an afocal optical system which provides no net convergence or divergence of light as it passes through the lens system. "Near neutral optical power" means the particular lens systems may provide a small amount of convergence or divergence of light, preferably less than 5% convergence or divergence, more preferably less than 1% convergence or divergence.

The complex modular afocal variator systems (CMAVs) of the present invention are obtained by providing a MAV combined with supplemental lens systems in front of the first positive lens system or behind the second positive lens system, or both. A CMAV of the present invention is integrated into optical devices to vary the actual focal length of the optical systems without the need to physically change the length dimension of the body of the optical device or other optical systems, or without the need to change the lens system or the lens position of an additional lens system to the front or rear.

"Spherical aberration" is the basic aberration which leads to the failure of a lens to form a perfect image of a monochromatic, on-axis point source object. Aspheric surfaces may be applied to reduce this defect. When rays from a point on the axis passing through the outer lens zones are focused closer to the lens than rays passing the central zones, the lens is said to have negative spherical aberration; if the outer zones have a longer focal length than the inner zones, the lens is said to have positive spherical aberration. In the first instance, the lens is said to be uncorrected or undercorrected; in the second it is overcorrected.

"Chromatic aberration" is the lens aberration resulting from the normal increase in refractive index of all common materials toward the blue end of the spectrum. The change in image size from one color to another is known at lateral chromatic difference of magnification MAVs, as previously known in the art, are themselves incapable of correcting spherical and chromatic aberrations. In fact, a typical MAV introduces very small but noticeable spherical and chromatic errors on its own. Usually, these can be overcome to a large extent by reducing the aperture of the system so that only the central part of the MAV is actually used, but this also limits the aperture possible from the entire optical device in which it is interfaced unless other optics are used to compensate, if possible.

The introduction of the MAV system in conjunction with a supplemental optical system to form a CMAV, as taught in the present invention, provides spherical and chromatic aberration corrective improvement that is obtained over a wide range of working and/or operational distances. A CMAV of the present invention provides a continuous transition and compensatory corrective improvement for spherical and chromatic aberrations over many working/operational distances. At the same time, this improvement makes it possible for optical devices to operate at greater apertures than a typical MAV would allow by itself.

A CMAV of the present invention is composed of one or more supplemental lens systems positioned in close proximity in front of the first positive lens system of the MAV, behind the second positive lens system of the MAV, or both. The supplemental lens system is a negative and positive lens system held in close proximity to a positive or negative lens of near or equal power of near or equal power. The supplementary negative and positive lens systems are preferably, but are not limited to, achromatic negative and positive lens systems. Preferably, the negative and positive lens systems of the supplemental lens system are chosen to be of near or similar focal length to that of the second positive lens system of the MAV.

Because the supplementary negative and positive lens systems are positioned in close proximity to one another and have the same or nearly the same optical power as one another, the supplemental lens system provides neutral or near neutral optical power.

In and of themselves, these supplemental lens systems are afocal additions to the original MAV. However, by juxtaposing their orientations with respect to each other, as well as whether the negative or positive system is chosen to be front or rear, different types of complex modular afocal variators (CMAV) can be provided. For example, when the supplemental lens system is placed behind the second positive lens system of the MAV, up to eight different types of CMAV modules can be provided (shown in FIGS. 3 and 4). Each CMAV module is only different with respect to the potential spherical and chromatic characteristics it imparts. Thus, by selecting one of these eight permutational CMAV modules, spherical and chromatic characteristics can be imposed on any optical device into which it can interfaced. This is highly desirable, for example, when a CMAV is selected to be used with infinity-corrected microscope objectives. Many infinity corrected objectives use proprietary but public domain systems which have deliberate spherical and chromatic errors in the objective optics which are corrected in the telescope optics. By choosing the appropriate CMAV permutation, much of this reciprocal error can be corrected by the CMAV itself. Further, the option of selecting among up to eight permutational modules allows lens designers to utilize the CMAV best suited to their demands. Consequently, each CMAV is non-formula specific in that it can be introduced into any optical device, provided there is physical room to do so. Yet, each CMAV will impart to any such optical device a spherical and chromatic characteristic of some kind or another. Further, a compatible CMAV will additionally correct errors arising within its front traditional section to some extent or another.

In addition to all of the foregoing which has emphasized adding supplemental optics to the rear system of a MAV to create a CMAV, the supplemental optics can be positioned in front of the MAV's first positive lens system instead of the second positive lens system. It is also understood that the supplemental optics can be added to be both in front and in back of the first and second positive lens systems. The essential requirement is that in doing so, the CMAV thus produced still and all operates as an afocal variator similar to the original MAV.

In preferred embodiments, the present invention provides the combination, in optical series, of a front objective lens (which in itself, can be composed of any optical construction deemed appropriate, including but not limited to any and all known microscope objective types, all known telescope objective types, any and all known eyepiece types, and, in fact, any and all other known imaging lenses or negative beam introducing types, either refractive or diffractive composed of glass, plastic, multiple elements of optical glass whether cemented or otherwise joined and/or spaced, or of any translucent minerals or any other known refractive materials of spherical or aspherical form, so long as they can eventually or in conjunction, produce a focus at any front or back conjugate), and a CMAV comprising a supplemental lens system which can be composed of any refractive materials or any known lens types known in the art as are required to provide a transitionally focusable spherical and chromatic improvement to an optical device.

These and other objects of the present invention will become apparent to those skilled in the art from the following detailed description, showing the contemplated novel construction, combination of elements as herein described, and, more particularly defined by the appended claims, it being understood that changes in the precise embodiments of the herein disclosed invention are meant to be included as coming within the claims, insofar as they may be precluded by the prior art.

Figure 1:
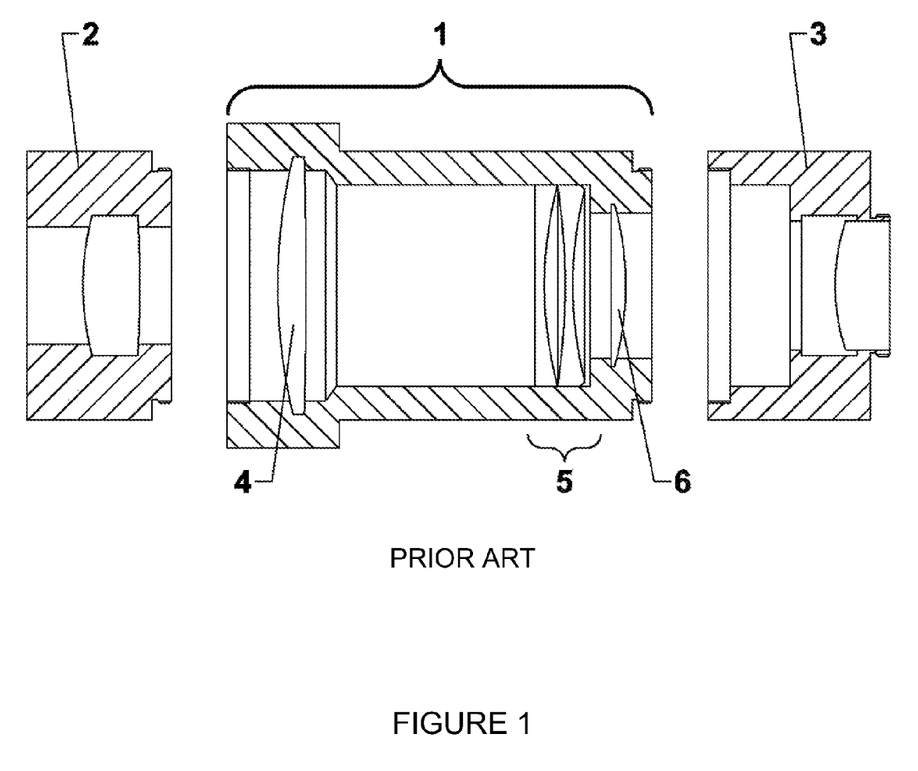
FIG. 1 illustrates an optical system as taught in the prior art containing a modular afocal variator (MAV) positioned between a front and rear optical system.

FIG. 1 shows an exploded view of an optical device containing a MAV as taught in U.S. Pat. No. 4,988,173. The optical device, in this case a telescope, comprises a front optical system 2 and a rear optical system 3 with a MAV 1 inserted in between. The MAV 1 contains a first positive lens system 4, in this case a single lens, in the front of the MAV 1 and a second positive lens system 6, also a single lens in this case, in the rear. A moveable central negative lens system 5 is positioned between the first positive lens system 4 and the second positive lens system 6. The exact position of the negative lens system 5 between the first positive lens system 4 and second positive lens system 6 can be adjusted to achieve the desired focus. As is standard in the art, the optical device was designed first and the MAV introduced into the device if physically possible. As discussed in U.S. Pat. No. 4,988,173, a MAV of this type can be introduced into an optical system with virtual disregard to considerations for changing the optical system's characteristics except to impart internal focusing. The MAV's position within the optical device was chosen to provide the greatest amount of internal focusing capability. No active correctional improvement for spherical or chromatic aberration using the MAV was taught or suggested.

Figure 2:
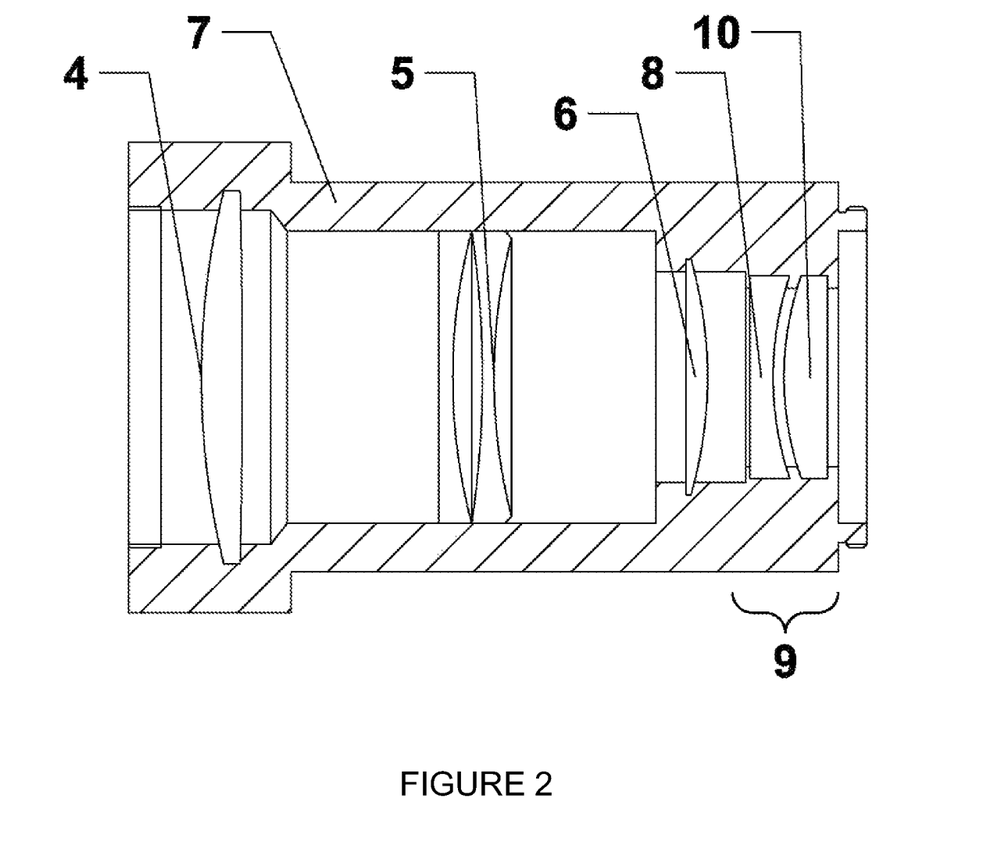
FIG. 2 shows a complex modular afocal variator (CMAV) module of the present invention, in which a supplemental lens system is positioned behind the second positive lens system.

FIG. 2 shows one CMAV of the present invention. Preferably, the optical components are mounted and held in a state-of-the-art fixed length housing 7 which permits activation and movement of central negative lens system 5 towards and away from front positive lens system 4 and second positive lens system 6, all constituting a MAV as shown in FIG. 1. However, as now taught in the present invention, the CMAV 11 also includes a supplemental lens system 9 positioned in back of the second positive lens system 6 so as to form a spherical and chromatic correctively-improving system. The supplemental lens system 9 comprises a supplementary negative lens system 8 and positive lens system 10 (in this case both single lenses) positioned in close proximity to each other so as to be of neutral or near to neutral power. Preferably, the supplemental lens system 9 is composed of negative and positive lens systems of equal or essentially near equal focal length, ideally equal to the focal length of the second positive lens system 6.

Figure 4:
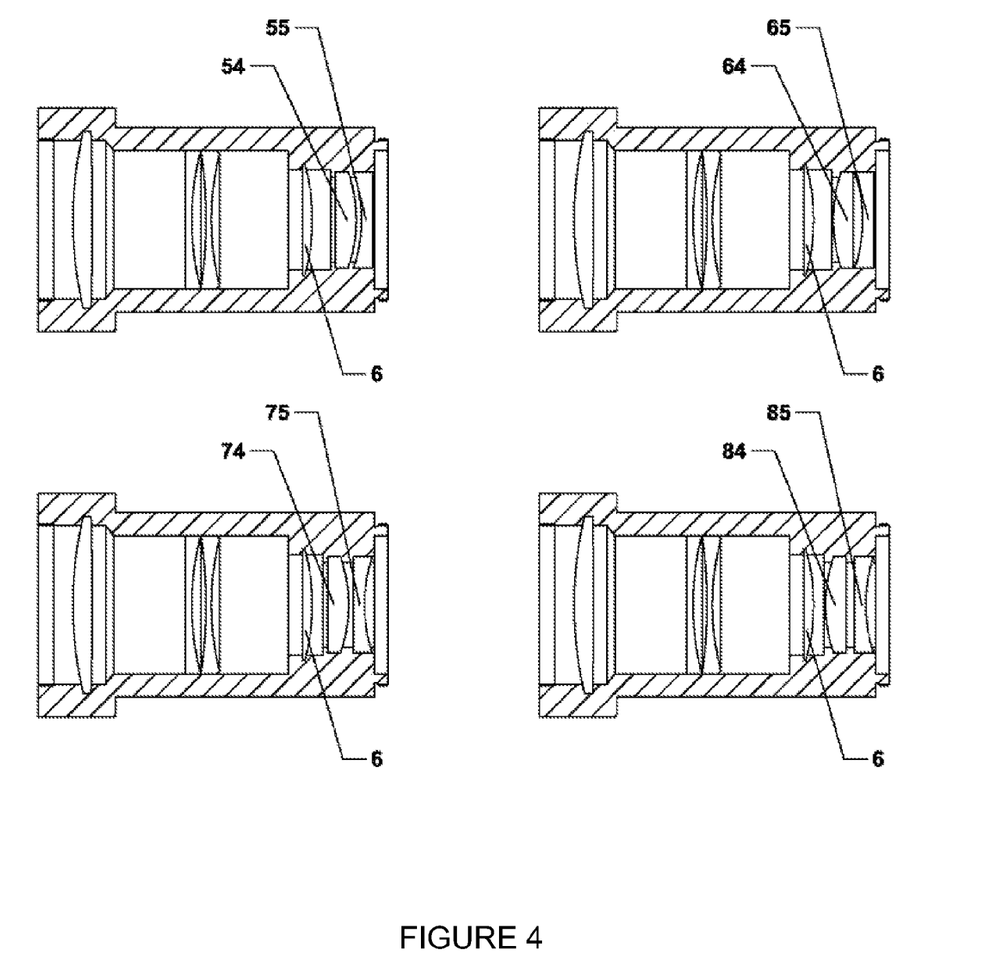
FIG. 4 shows four CMAV modules of the present invention in which the supplemental lens system is also positioned behind the second positive lens system. In each of these modules, however, the positive lens of the supplemental lens system is closest to the second positive lens system. Similar to the modules shown in FIG. 3, the orientation of the negative and positive lens in the supplemental lens system differ in each of these modules.

For permutational reasons, positive lens system 10 can be positioned, alternatively, in front of negative lens system 8 as shown in the configurations of FIG. 4 herein. A multitude of CMAVs are possible by varying the orientation of the supplementary positive lens system 10 and negative lens system 8, the single requirement being that the supplemental lens system 9 be a neutral or near-neutral addition so that the original MAV is still an afocal variator when it is upgraded to being a CMAV. Spherical and chromatic aberration corrective improvement or deliberate introduction of compensatory error to some extent or another, by means of lens orientation and element selection is thus initially provided. By selecting multiple or combined elements for the negative and positive lens systems 8 and 10, further control of aberrations is provided. The whole device now constitutes a functional Complex Modular Afocal Variator (CMAV) that can be made, derived, computed according to practice in the art, and/or empirically determined, in numerous permutations, provided that the additional negative and positive lens systems 8 and 10 combine to be of neutral or near neutral optical power.

Figure 3:
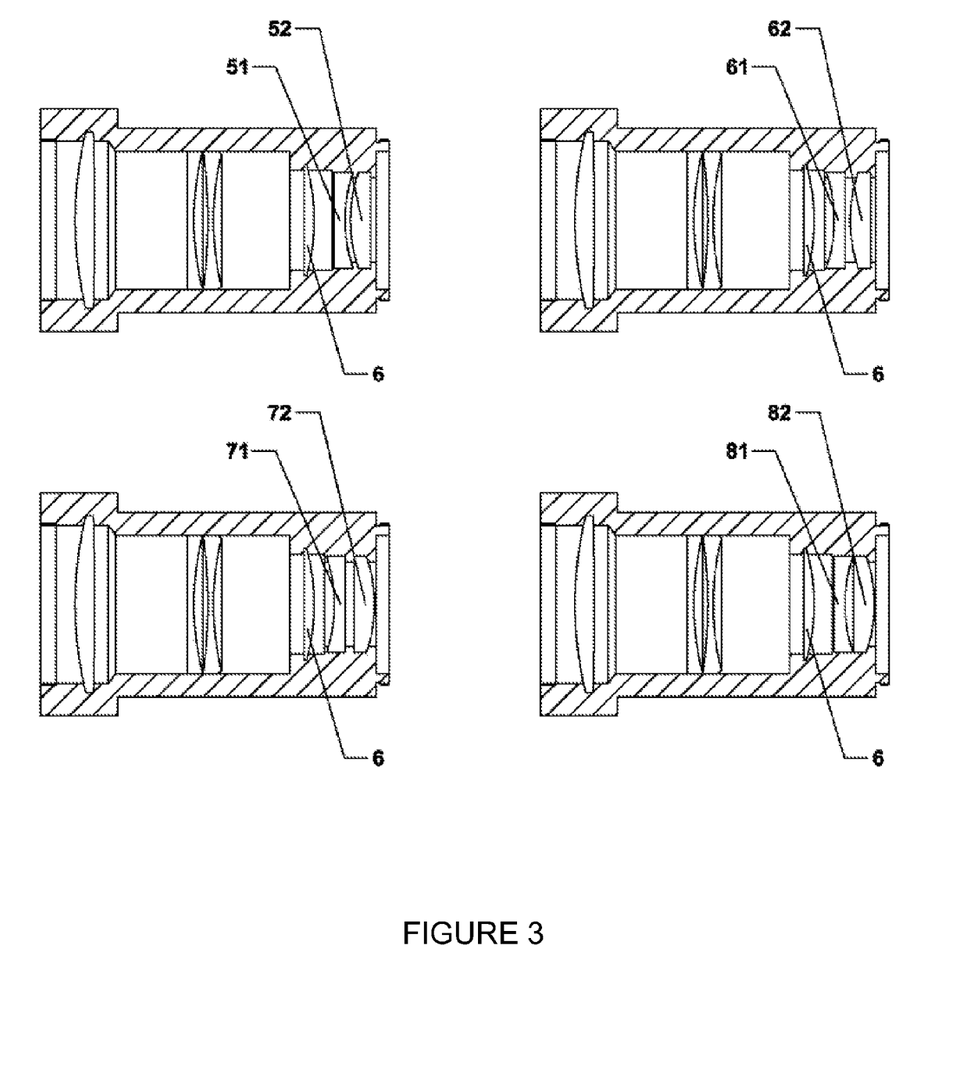
FIG. 3 shows four CMAV modules of the present invention in which the supplemental lens system is positioned behind the second positive lens system. In each of these modules, the negative lens of the supplemental lens system is closest to the second positive lens system, however the orientation of the negative and positive lens in the supplemental lens system differ in each module.

FIG. 3 shows four permutational CMAV modules in which the supplementary negative lens system (51, 61, 71 and 81 in the different configurations) is positioned closer to the second positive lens system 6 of the MAV than the supplementary positive lens system (52, 62, 72 and 82), but where each of the lens orientations differ. Lens combinations 51/52, 61/62, 71/72 and 81/82 are the possible orientations when a negative lens system is positioned closest to the second positive lens system 6 of the MAV.

FIG. 4 shows four permutational CMAV modules in which the supplementary positive lens system (54, 64, 74 and 84 in the different configurations) is positioned closer to the second positive lens system 6 of the MAV than the supplementary negative lens system (55, 65, 75 and 85), but where each of the lens orientations differ. Lens combinations 54/55, 64/65, 74/75 and 84/85 are the possible orientations when a positive lens system is positioned closest to the second positive lens system 6 of the MAV.

Figure 5:
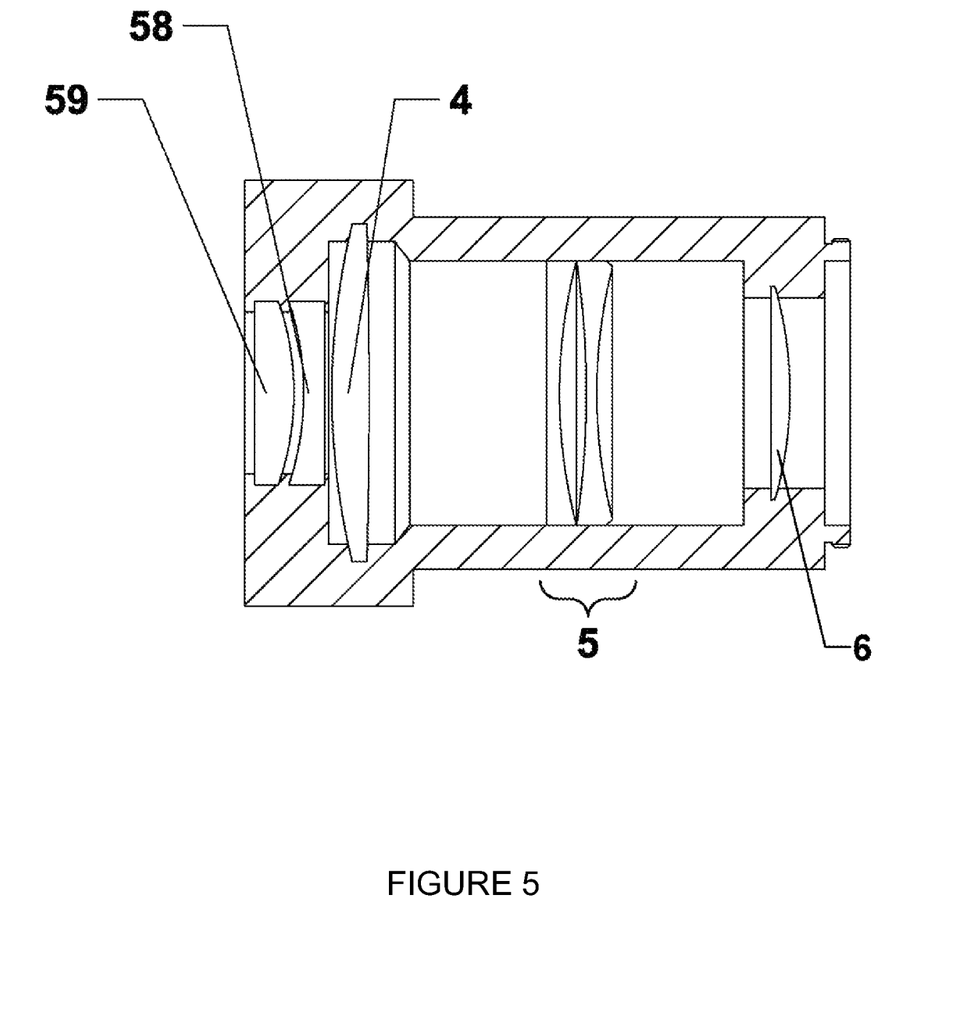
FIG. 5 shows a CMAV module of the present invention in which the supplemental lens system of the present invention is positioned in front of the first positive lens system.

FIG. 5 shows a CMAV module in which the supplemental lens system 9 of the present invention is positioned in front of the first positive lens system 4. This supplemental lens system 9 comprises a supplementary positive lens system 59 and supplementary negative lens system 58.

Figure 6:
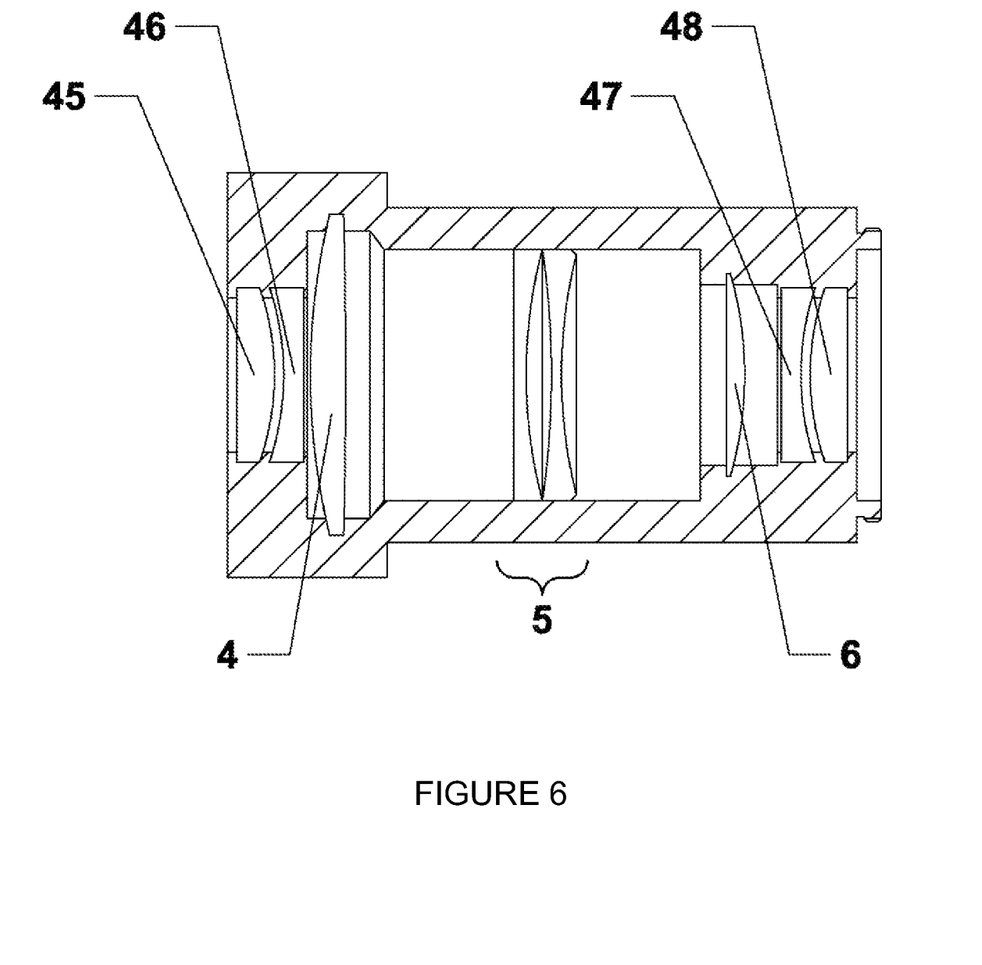
FIG. 6 shows a CMAV module of the present invention in which a first supplemental lens system is positioned in front of the first positive lens system and a second supplemental lens system is positioned behind the second positive lens system.

FIG. 6 shows a CMAV module containing supplemental lens systems positioned both in front of and in back of the original MAV system. The supplemental lens system in front of the first positive lens system 4 comprises a supplementary positive lens 45 and negative lens 46, and the supplemental lens system 9 in back of the original MAV system comprises a supplementary negative lens 47 and positive lens 48. In embodiments where the CMAV contains two supplemental lens systems, the negative and positive lens systems of each supplemental lens system may have the same or different configurations. Additionally, the distance between the supplementary positive lens system and supplementary negative lens system can be slightly adjusted, i.e., moved closer together or further apart, if desired. The distance between the supplementary positive lens system and supplementary negative lens systems can be adjusted when the lenses are in any configuration as shown in FIGS. 3-6. When the optical system contains two supplemental lens systems (one positioned in front of the MAV and the other positioned behind the MAV), the distance between the supplementary positive lens system and supplementary negative lens system can be adjusted in either supplemental lens system or both.

Figure 7:
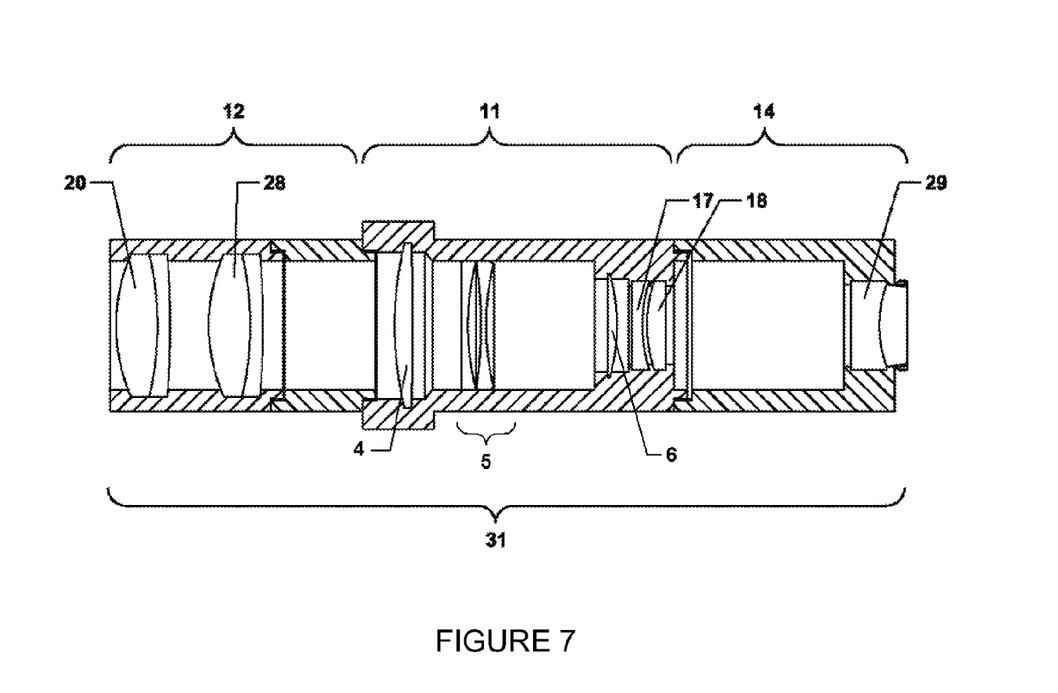
FIG. 7 illustrates a CMAV module as depicted in FIG. 2 placed within a conventional optical device.

FIG. 7 shows a complete optical device 31 in which a CMAV 11 is sandwiched between a front objective lens system 12, containing lenses 20 and 28, and a rear optical system 14, containing an amplifier lens 29. In this particular device, lenses 20 and 28 are Achromat lenses having a c.400 mm focal length, and the rear negative plano-concave amplifier lens 29 has a focal length of c.−100 mm. The CMAV 11 contains a central negative lens 5 positioned between a front positive lens system 4 and a second positive lens system 6, as described above. Additionally, the CMAV 11 contains a supplemental lens system 9 comprising a supplementary negative lens 17 and supplementary positive lens 18. In this example, the supplementary negative lens 17 is a c.−150 mm focal length plano-concave lens positioned in very close proximity to the supplementary positive lens 18, which is a positive plano-convex lens of c.+150 mm focal length by art known means. The CMAV 11 is mounted to front objective lens system 12 and rear optical system 14 by art known means to constitute a telescope system, as would be the case with a MAV system per U.S. Pat. No. 4,998,173; however, the CMAV 11 is not only interfaced as a focusing means, but as spherical and chromatic correctionally-improving system as well, capable of focus from infinity to as close as c.600 mm from an object to be viewed. All lens systems shown can subsequently be made of cemented or spaced multiple lens elements.

The system above and equivalents which can be derived from it can be made from any suitable combination of optical materials or lens types, be they of whatever refractive, diffractive and dispersive characteristics as known in the art, the only limitation being their suitability for actual use. In addition, the use of single or multiple focal variators in other applications to focus, concentrate or disperse light or other electromagnetic wavelengths is also taught. While not shown in FIGS. 1 through 7, the addition of art known fixed or variable diaphragms, or other known optical components inside the optical system components may be used to obtain an excellent depth of field or to control other aberrations as well as the speed of the entire system as focus gets progressively closer to an object.

Having now fully described the present invention in some detail by way of illustration and examples for purposes of clarity of understanding, it will be obvious to one of ordinary skill in the art that the same can be performed by modifying or changing the invention within a wide and equivalent range of conditions, formulations and other parameters without resort to undue experimentation without affecting the scope of the invention or any specific embodiment thereof, and that such modifications or changes are intended to be encompassed within the scope of the appended claims. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms.

When a group of materials, compositions, components or compounds is disclosed herein, it is understood that all individual members of those groups and all subgroups thereof are disclosed separately. When a Markush group or other grouping is used herein, all individual members of the group and all combinations and subcombinations possible of the group are intended to be individually included in the disclosure. Every formulation or combination of components described or exemplified herein can be used to practice the invention, unless otherwise stated. Whenever a range is given in the specification, for example, a temperature range, a time range, or a composition range, all intermediate ranges and subranges, as well as all individual values included in the ranges given are intended to be included in the disclosure. In the disclosure and the claims, "and/or" means additionally or alternatively. Moreover, any use of a term in the singular also encompasses plural forms.

All references cited herein are hereby incorporated by reference in their entirety to the extent that there is no inconsistency with the disclosure of this specification. All headings used herein are for convenience only. All patents and publications mentioned in the specification are indicative of the levels of skill of those skilled in the art to which the invention pertains, and are herein incorporated by reference to the same extent as if each individual publication, patent or patent application was specifically and individually indicated to be incorporated by reference. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

The invention claimed is:

1. A complex modular afocal variator comprising:
   a) a fixed length housing;
   b) a first positive lens system, a central negative lens system, and a second positive lens system disposed within the fixed length housing, wherein the central negative lens system is positioned between the first and second positive lens systems and is able to be moved continuously towards and away from the first positive lens system and towards and away from the second positive lens system; and
   c) a supplemental lens system disposed within the fixed length housing, wherein the supplemental lens system is positioned in front of the first positive lens system or positioned behind the second positive lens system, and wherein said supplemental lens system comprises a supplementary positive lens system and a supplementary negative lens system that are of equal power or near equal power to each other,
   wherein the supplementary positive lens system and supplementary negative lens system are positioned in close proximity to one another and wherein the supplementary positive lens system and supplementary negative lens system have the same focal length as the second positive lens system.

2. The complex modular afocal variator of claim 1 wherein said complex modular afocal variator is able to provide magnification and focusing of an image without altering the length of the fixed length housing or the distance between the first and second positive lens systems, and wherein said complex modular afocal variator is able to provide spherical and chromatic aberration correction.

3. The complex modular afocal variator of claim 1 further comprising a second supplemental lens system disposed within the fixed length housing, wherein said second supplemental lens system comprises a second supplementary positive lens system and a second supplementary negative lens system that are of equal power or near equal power to each other, and wherein one of either the supplemental lens system or second supplemental lens system is positioned in front of the first positive lens system and the other is positioned behind the second positive lens system.

4. The complex modular afocal variator of claim 1 wherein the supplemental lens system is an afocal optical system that does not affect the focus of light passed through the complex modular afocal variator.

5. The complex modular afocal variator of claim 1 wherein the supplementary negative lens system is positioned in front of the supplementary positive lens system in the supplemental lens system.

6. The complex modular afocal variator of claim 1 wherein the supplementary positive lens system is positioned in front of the supplementary negative lens system in the supplemental lens system.

7. The complex modular afocal variator of claim 1 wherein the supplementary positive lens system and negative lens system of the supplemental lens system are achromatic lenses.

8. The complex modular afocal variator of claim 1 wherein the fixed length housing comprises a front end connecting means and a rear end connecting means able to attach the fixed length housing to a front optical system and a rear optical system.

9. An optical device comprising a front optical system; a rear optical system; and a complex modular afocal variator in optical series, wherein said complex modular afocal variator comprises:
   a) a fixed length housing;
   b) a first positive lens system, a central negative lens system, and a second positive lens system disposed within the fixed length housing, wherein the central negative lens system is positioned between the first and second positive lens systems and is able to be moved continuously towards and away from the first positive lens system and towards and away from the second positive lens system;
   c) a supplemental lens system disposed within the fixed length housing, wherein the supplemental lens system is positioned in front of the first positive lens system or positioned behind the second positive lens system, and wherein said supplemental lens system comprises a supplementary positive lens system and a supplementary negative lens system that are of equal power or near equal power to one each other; and
   d) a second supplemental lens system disposed within the fixed length housing, wherein said second supplemental lens system comprises a second supplementary positive lens system and a second supplementary negative lens system that are of equal power or near equal power to each other, and wherein one of either the supplemental lens system or second supplemental lens system is positioned in front of the first positive lens system and the other is positioned behind the second positive lens system.

10. The optical device of claim 9 wherein said complex modular afocal variator is able to provide magnification and focusing of an image without altering the length of the optical device and wherein said complex modular afocal variator is able to provide spherical and chromatic aberration correction.

11. The optical device of claim 9 wherein the supplemental lens system comprises a positive lens system and a negative lens system positioned in close proximity to one another.

12. The optical device of claim 11 wherein the positive lens system and negative lens system of the supplemental lens system have the same focal length as the second positive lens system.

13. A method of correcting spherical or chromatic aberration in an optical system comprising the steps of inserting a complex modular afocal variator into optical series with said optical system, wherein said complex modular afocal variator comprises:
 a) a fixed length housing;
 b) a first positive lens system, a central negative lens system, and a second positive lens system disposed within the fixed length housing, wherein the central negative lens system is positioned between the first and second positive lens systems and is able to be moved continuously towards and away from the first positive lens system and towards and away from the second positive lens system; and
 c) a supplemental lens system disposed within the fixed length housing, wherein the supplemental lens system is positioned in front of the first positive lens system or positioned behind the second positive lens system, and wherein said supplemental lens system comprises a supplementary positive lens system and a supplementary negative lens system that are of equal power or near equal power to each other; and
 d) a second supplemental lens system disposed within the fixed length housing, wherein said second supplemental lens system comprises a second supplementary positive lens system and a second supplementary negative lens system that are of equal power or near equal power to each other, and wherein one of either the supplemental lens system or second supplemental lens system is positioned in front of the first positive lens system and the other is positioned behind the second positive lens system.

14. The method of claim 13 wherein the supplemental lens system comprises a positive lens system and a negative lens system positioned in close proximity to one another.

15. The method of claim 14 wherein the positive lens system and negative lens system of the supplemental lens system have the same or similar focal lengths as the second positive lens system.

* * * * *